Patented Sept. 5, 1944

2,357,484

UNITED STATES PATENT OFFICE 2,357,484

PROCESS FOR PRODUCING COMPOUNDS CONTAINING AN N-SUBSTITUTED AMIDE GROUP

Elmore Louis Martin, Wilmington, Del., assignor to E. I. du Pont de Nemours & Company, Wilmington, Del., a corporation of Delaware No Drawing. Application September 12, 1941, Serial No. 410,584

12 Claims. (Cl. 260—239)

This invention relates to the preparation of N-substituted amides from nitriles, amines and water, and more particularly to a vapor-phase, catalytic process for preparing N-substituted amides.

It is an object of this invention to prepare an N-substituted amide from a nitrile, water, and an amino-hydrogen containing amine. A further object of the invention is to provide a vapor-phase, catalytic method for accomplishing the foregoing preparation. Yet another object is to prepare a cyclic compound containing in the ring an N-substituted amide linkage by reacting water and an aliphatic amino-hydrogen containing aminonitrile in the vapor phase over a contact material. Other objects will be apparent hereinafter.

These objects are accomplished according to this invention by passing a vaporized mixture of water, a nitrile and an amino-hydrogen containing amine over a dehydration-type catalyst. Although solid catalysts of the dehydration type are effective in the process of this invention, it should not be inferred that dehydration actually occurs, nor is the invention restricted to any theory of reaction. The expression "dehydration catalyst" is employed to designate generically a well-defined class of catalysts found to be useful in the present invention.

The invention, in one preferred embodiment, comprises passing a vaporized mixture of water and an aliphatic aminonitrile containing at least one amino-hydrogen atom over a dehydration-type catalyst.

By the process of this invention, a compound containing a nitrile group may be rapidly reacted with a compound containing an amine group having at least one amino-hydrogen atom and with water to produce an N-substituted amide and ammonia in very good yield with but slight formation of by-products. When an open-chain aliphatic aminonitrile, in which the amino and nitrile groups are separated by at least two atoms in contiguous relation, is used the product obtained is a cyclic compound, namely, a lactam.

It is generally preferable to employ an open-chain aliphatic amine and an open-chain aliphatic nitrile or an open-chain aliphatic aminonitrile in practicing the invention, since yields are high, vaporization is simplified, and by-product formation is low. However, the employment of aromatic, cycloaliphatic and heterocyclic amines and nitriles is not excluded.

In the practice of the invention, the vaporized reactants are passed over a contact material characterized by having dehydrating properties. Suitable contact materials include metallic oxides such as alumina, thoria, ceria, zirconia, chromium sesquioxide, blue tungsten oxide, titanium oxide, beryllium oxide, uranous oxide, vanadium oxide, magnesia, blue molybdenum oxide, ferrous oxide, and the like; certain non-metallic oxides such as silica, boron oxide, and the like; salts such as sulfates, phosphates, and silicates of aluminum, thorium, cerium, zirconium, and magnesium; and acidic substances, such as, phosphoric acid and heteropoly acids, for example, silicotungstic acid, phosphomolybdic acid, and borophosphoric acid.

The contact materials may be used severally or in admixture. If desired, they may be incorporated with or deposited on supporting or "carrier" materials of which the following are typical: charcoal, pumice, clay, fuller's earth, silica gel, diatomaceous earth, bentonite, montmorillonite, and the like. Under some conditions, such carrier materials have dehydrating activity and may be used alone. Especially good results are secured employing activated alumina, silica gel, and borophosphoric acid which constitute a preferred class of contact materials.

The temperature at which the reactants are passed over the contact material must be sufficient to maintain the reactants in the vapor phase, but insufficient to cause substantial cracking of the reactants or reaction products. It has been found that temperatures between 150° and 500° C. are suitable and in general temperatures within the more restricted range of between 200° C. and 350° C. are preferred.

The time during which the mixture of vaporized amine, nitrile and water is contacted with the contact material varies inversely with the reaction temperature employed, but in all cases is relatively short, being in general not more than about one minute, and preferably within the range of from about 0.1 second to about 10.0 seconds.

After passing over the contact material the reaction mixture is condensed and the product separated, usually by fractional distillation. The reaction mixture contains water, ammonia, some unchanged amine and nitrile or, as the case may be, some unchanged aminonitrile, and the formed N-substituted amide as well as a very small amount of by-products. In the preferred practice of the invention, unchanged amine and nitrile or, as the case may be, unchanged aminonitrile, are recovered, admixed with make-up water, and recycled to the catalyst chamber after being vaporized. By this preferred method of working, it is possible to obtain a very high percentage yield of desired product, since the catalyst does not lose its activity and the process forms but a very slight amount of by-products.

The space velocity is a measure of the rate at which the gaseous reactants pass through the catalyst and is defined as the number of volumes of gas, calculated at standard conditions, that traverse one volume of catalyst during one hour. The term "time of contact" is defined as the time in seconds required for the gaseous reactants to traverse the entire volume of the catalyst at the temperature and pressure of the reaction, assuming that no change in volume occurs. The contact time in seconds is calculated from the space velocity by the following expression:

Time of contact in seconds=

$$\frac{273 \times 60 \times 60}{(273+\text{temp. in °C}) \times \text{space velocity}}$$

The following examples serve to illustrate the preferred practice of this invention, but it is not limited thereto.

*Example 1.*—A 35% by weight aqueous solution of epsilon-aminocapronitrile (neutral equivalent 112.0) is passed at the rate of 3.0±0.1 cc. per minute into a vaporizer provided with heating means and maintained at 305° C. The resulting gaseous mixture is introduced into a reaction vessel containing 54 cc. of 8 to 14 mesh activated alumina, the vessel being provided with heating and cooling means, and being maintained at a temperature of 305° C. After passing over the alumina, the reaction vapors are passed into a condenser provided with cooling means. Under these conditions the molecular ratio of aminonitrile to water is 1:11.5, the space velocity is 2830–3030, and the contact time is 0.55–0.60 second. The vapor mixture is converted mainly into epsilon-caprolactam and ammonia. The reaction products are condensed by cooling and the condensate is then moderately heated to expel ammonia. The resulting residue is introduced into a distilling vessel and fractionated under reduced pressure. Unconverted aminonitrile boiling below 114° C. at 4 mm. and epsilon-caprolactam boiling at 108–109° C. at 3 mm. (solidifying at 68.4–68.6° C.) is obtained in the proportion of 29 grams of unchanged aminonitrile and 330 grams of lactam. Only a trace of residual by-products remain in the vessel after distillation.

*Example 2.*—An 80% by weight aqueous solution of epsilon-aminocapronitrile, neutral equivalent 112.0, is passed at the rate of 5.1±0.1 cc. per minute into a vaporizer provided with heating means and maintained at 305° C. The resulting gaseous mixture is introduced into a reaction vessel provided with heating and cooling means and containing 125 cc. of 8 to 14 mesh activated alumina maintained at 305° C. Under these conditions the molecular ratio of aminonitrile to water is 1:1.55, the space velocity is 920–960, and the contact time is 1.8–2.0 seconds. The reaction products are condensed by cooling and the condensate is then moderately heated to expel ammonia. The resulting residue is introduced into a distilling vessel and fractionated under reduced pressure. The reaction product on distillation yields unchanged aminonitrile boiling below 123° C. at 5 mm. and epsilon-caprolactam boiling at 123° C. at 5 mm. in the proportion of 38 grams of aminonitrile and 540 grams of lactam. Only a trace of residuary by-products remain in the distillation vessel.

*Example 3.*—The passage of a 15% aqueous solution of 7-aminoheptanonitrile through the apparatus described in Example 1 at the rate of 1.0±0.1 cc. per minute at 305° C. yields the solid, cyclic 8-membered lactam, boiling at 133° C. to 135° C. under 4 mm. pressure.

*Example 4.*—A suspension of 5 grams of 10-aminocapronitrile in 95 grams of water is passed at the rate of 1.0±0.1 cc. per minute into a vaporizer provided with heating means and maintained at 305° C. The resulting gaseous mixture is introduced into a reaction vessel provided with heating and cooling means and containing 54 cc. of 8 to 14 mesh activated alumina heated to 305° C. Under these conditions the molecular ratio of aminonitrile to water is 1:160, the space velocity is 1190–1450, and the contact time is 1.25–1.30 seconds. The reaction products are condensed by cooling and the condensate is introduced into a distilling vessel. Fractional vacuum distillation of the reaction mixture yields some unchanged aminonitrile and a normally solid material, boiling at 130–140° C. at 2 mm. pressure. By crystallizing this latter fraction from petroleum ether, there is obtained colorless glistening needles of the 11-membered cyclic lactam,

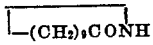

M. P. 128–130° C.

*Example 5.*—A mixture of 15.4 grams of N-butylamine, 11.0 grams of propionitrile, and 10 grams of water is passed at the rate of 0.5±0.1 cc. per minute into a vaporizer provided with heating means and maintained at 305° C. The resulting gaseous mixture is introduced into a reaction vessel provided with heating and cooling means and containing 54 cc. of 8 to 14 mesh borophosphoric acid (prepared as described in Example 1 of U. S. 2,200,734), maintained at 305° C. Under these conditions the molecular ratio of amine:nitrile:water is 1:1:2.25, the space velocity is about 250–300, and the contact time is 6.0–6.5 seconds. Fractional distillation of the reaction mixture yields 12 grams of N-n-butyl propionamide boiling at 235–237° C. at atmospheric pressure, together with unreacted material. There is only a trace of residue.

In place of the aminonitriles of the examples, there may be used aminonitriles of the general formula

R'HN—R—CN in which R is a divalent organic radical and R' is a univalent hydrocarbon radical or a hydrogen atom. As additional illustrations of such aminonitriles may be mentioned 2-aminoacetonitrile,

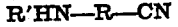

3-aminopropionitrile,

4-aminobutyronitrile,

5-amino valeronitrile,

6-amino-3-oxacapronitrile,

gamma [(3-aminopropyl)-N-methylamino] propionitrile,

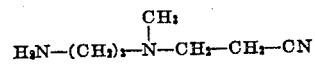

o(2-aminoethyl) benzylcyanide, $$H_2N-CH_2-CH_2-C_6H_4-CH_2-CN$$

o-cyanobenzylamine, $$H_2N-CH_2-C_6H_4-CN$$

o-aminobenzylcyanide, $$H_2N-C_6H_4-CH_2-CN$$

o-aminophenoxypropionitrile, $$H_2N-C_6H_4-O-CH_2-CH_2-CN$$

Aminoamides of general formula $$R'NH-R-CONH_2$$

also yield lactams by the method of this invention and include aminoamides of acids corresponding to the abovementioned aminonitriles as well as $$H_2N-(CH_2)_5-CONH_2$$

Nitriles of the general formula R''—CN in which R'' is a univalent organic radical and amines of general formula R'R''NH, in which R' and R'' have the significance previously indicated may be used to produce N-substituted amides of general formula $$R''-CONR'R''$$

Such nitriles include acetonitrile, $CH_3$—CN; valeronitrile, $C_4H_9CN$; bezonitrile, $C_6H_5$—CN; benzylcyanide, $C_6H_5$—$CH_2$—CN; ethoxy acetonitrile, $C_2H_5$—O—$CH_2$—CN; butyl (beta-cyanoethyl) sulfide, $C_4H_7$—S—$CH_2$—$CH_2$—CN; decylcyanide, $C_{10}H_{21}$—CN; pentadecylcyanide, $$C_{15}H_{13}-CN$$

and heptadecylcyanide, $C_{17}H_{35}$—CN. Amines of the general formula R''R'NH include methylamine, $CH_3$—$NH_2$; diethyl amine, $(C_2H_5)_2NH$; benzylmethylamine, $C_6H_5$—$CH_2$—$NHCH_3$; dipropylamine, $(C_3H_7)_2NH$; amyl amine, $C_5H_{11}NH_2$; amyl (beta aminoethyl) ether, $$C_5H_{11}-O-CH_2-CH_2-NH_2$$

amyl (3 amino propyl) sulfide, $$C_5H_{11}-S-(CH_2)_3-NH_2$$

decylmethylamine, $C_{10}H_{21}$—$NHCH_3$; octadecylamine, $C_{18}H_{37}NH_2$; and aniline, $C_6H_5NH_2$.

Dinitriles of general formula CN—R—CN in which R has previously been defined may also be reacted with amines of general formula R''R'NH and water over a catalyst to produce diamides of general formula $$R'R''NOC-R-CONR'R''$$

as well as cyanoamides of formula $$NC-R-CONR'R''$$

Such dinitriles include malononitrile, $$NC-CH_2-CN$$

succinonitrile, NC—$(CH_2)_2$—CN; glutaronitrile, $$NC-(CH_2)_3-CN$$

adiponitrile, $$NC-(CH_2)_4-CN$$

pimelonitrile, NC—$(CH_2)_5$—CN; suberonitrile, NC—$(CH_2)_8$—CN; cyanomethylphenylacetonitrile, $$NC-CH_2-C_6H_4-CH_2-CN$$

cyanophenylacetonitrile, $$NC-C_6H_4-CH_2-CN$$

beta, beta'-dicyanodiethyl ether, $$NC-CH_2-CH_2-O-CH_2-CH_2-CN$$

and gamma, gamma'-dicyanodipropyl thioether, NC—$(CH_2)_3$—S$(CH_2)_3$—CN. Diamines of general formula R'NH—R—NHR' may also be reacted with nitriles of general formula R''—CN and water over a catalyst to produce diamides of general formula $$R''-CONR'-R-NR'-CO-R''$$

as well as aminoamides of formula $$R'NH-R-NR'-CO-R''$$

It is also within the scope of this invention to react diamines of general formula $$R'NH-R-NHR'$$

with dinitriles of general formula NC—R—CN and water in the presence of a contact material to produce cyanoamides of general formula $$R'NH-R-NR'-OC-R-CN$$

and cyclic diamides of formula $$R'N-R-R'N-OC-R-CO$$

By the process of this invention other many membered cyclic compounds, e. g., esters, ketones, and ethers can be prepared. The process is particularly useful for the preparation of cyclic compounds which contain more than 6 atoms in one ring.

It is also within the scope of this invention to operate at higher or lower temperatures than mentioned in the examples but in general as previously indicated, the most favorable temperatures are 150° to 500° C., preferably 200° to 350° C. Reduced and increased pressures may also be used. Although it is preferable that the ratio of amine to nitrile be 1:1, higher or lower ratios of amine to nitrile may also be used. Considering the reaction, it is apparent that the maximum yield of amide is obtained when the molecular ratio of water to nitrile is at least 1:1. In some cases a higher ratio of water is advantageous especially if the reaction involves dinitriles and diamines, as high dilution favors ring formation and decreases the amount of linear polymer formed. Hydrogen sulfide and hydrogen selenide may replace a part or all of the water.

The contact time required to obtain the maximum yields of reaction products from an amine, a nitrile, and water in the presence of a contact material depends upon the nature of the reaction, the catalyst, and the temperature, but in general may vary somewhat from the preferred range as the reactants and reaction products are stable to the reaction conditions.

It is also within the scope of this invention to vaporize each of the reactants separately, mix the reactants in the proper molecular ratio in the gaseous phase and bring the resulting gaseous mixture into contact with the contact material. However, in most cases the amine, nitrile and water are best vaporized together. It is also possible to use an inert gas or vapor as a diluent or heating agent for the reaction.

Various changes may be made in the method hereinbefore described without departing from the scope of the invention or sacrificing the advantages thereof.

What is claimed is:

1. The process for producing a compound containing an N-substituted amide group which comprises bringing a vaporized mixture of water and a member of the group consisting of amino nitriles and a mixture of an amine and a nitrile into contact with a dehydration catalyst for a period of time of not more than one minute and at a temperature between 150° C. and 500° C., so coordinated as to give a substantially complete reaction producing the compound.

2. A process for producing a compound containing an N-substituted amide group which comprises bringing a vaporized mixture of water, an aliphatic nitrile and an aliphatic amine having at least one amino-hydrogen atom into contact with a dehydration catalyst for a period of time of not more than one minute and at a temperature between 150° C. and 500° C., so coordinated as to give a substantially complete reaction producing the compound.

3. A process for producing a compound containing an N-substituted amide group which comprises bringing a vaporized mixture of water, an aliphatic nitrile and an aliphatic amine having at least one amino-hydrogen atom into contact with a dehydration catalyst for a period of time of not more than one minute and at a temperature between 200° C. and 350° C., so coordinated as to give a substantially complete reaction producing the compound.

4. The process for producing a compound containing an N-substituted amide group which comprises bringing a vaporized mixture of water and an aliphatic aminonitrile having at least one amino-hydrogen atom into contact for not more than one minute with a dehydration catalyst at an elevated temperature between 150° C. and 500° C.

5. The process for producing a compound containing an N-substituted amide group which comprises bringing a vaporized mixture of water, propionitrile, and N-butylamine into contact for not more than one minute with a dehydration catalyst at an elevated temperature between 150° C. and 500° C.

6. The process for producing a compound containing an N-substituted amide group which comprises bringing a vaporized mixture of water and epsilon-aminocapronitrile into contact for not more than one minute with a dehydration catalyst at an elevated temperature between 150° C. and 500° C.

7. The process for producing a compound containing an N-substituted amide group which comprises bringing a vaporized mixture of water and 10-aminocapronitrile into contact for not more than one minute with a dehydration catalyst at an elevated temperature between 150° C. and 500° C.

8. The process which comprises vaporizing a solution of about 35 parts by weight of epsilon-aminocapronitrile in about 65 parts by weight of water at the rate of about 3 cc. per minute, heating the vapors to about 305° C., bringing the heated vapors into a closed reaction vessel containing about 54 cc. activated alumina heated to about 305° C., contacting the heated vapors with the catalyst for about 0.55–0.60 second, withdrawing and condensing the reaction vapors, and fractionally distilling the condensate under reduced pressure to recover epsilon-caprolactam.

9. The process for producing a lactam which comprises bringing a vaporized mixture of water and an aliphatic aminonitrile having at least one amino-hydrogen atom into contact at an elevated temperature between 150° C. and 500° C., for a time insufficient for substantial polymer formation, with a dehydration catalyst selected from the group consisting of activated alumina, silica gel, and borophosphoric acid.

10. The process for producing epsilon-caprolactam which comprises bringing a vaporized mixture of water and epsilon-aminocapronitrile into contact for not more than one minute with a dehydration catalyst selected from the group consisting of activated alumina, silica gel, and borophosphoric acid, at an elevated temperature between 200° C. and 350° C.

11. The process for producing epsilon-caprolactam which comprises bringing a vaporized mixture of water and epsilon-aminocapronitrile into contact, for 0.1 to 10.0 seconds, with an activated alumina catalyst at an elevated temperature between 200° C. and 350° C.

12. The process of claim 11 wherein the vaporized mixture of water and epsilon-aminocapronitrile contains about 80% by weight of epsilon-aminocapronitrile.

ELMORE LOUIS MARTIN.